United States Patent
Sabelström

[19]
[11] Patent Number: 6,077,330
[45] Date of Patent: Jun. 20, 2000

[54] AIR DRYING DEVICE FOR A PNEUMATIC SYSTEM

[75] Inventor: Mats Sabelström, Billdal, Sweden

[73] Assignee: AB Volvo, Sweden

[21] Appl. No.: 09/043,597

[22] PCT Filed: Sep. 20, 1996

[86] PCT No.: PCT/SE96/01162

§ 371 Date: Jun. 10, 1998

§ 102(e) Date: Jun. 10, 1998

[87] PCT Pub. No.: WO97/11274

PCT Pub. Date: Mar. 27, 1997

[30] Foreign Application Priority Data

Sep. 22, 1995 [SE] Sweden .................................. 9503287

[51] Int. Cl.[7] .................................................. B01D 53/04
[52] U.S. Cl. ...................... 95/11; 55/DIG. 17; 95/21; 95/25; 95/26; 95/148; 96/111; 96/113; 96/114; 96/115; 96/116; 96/143
[58] Field of Search ................................. 95/8, 10, 21, 11, 95/25, 26, 148; 96/109, 111, 114, 115, 116, 113, 417, 397, 424, 425, 428, 143; 55/DIG. 17

[56] References Cited

U.S. PATENT DOCUMENTS

| | | | |
|---|---|---|---|
| 3,279,151 | 10/1966 | Kauer, Jr. et al. | 55/DIG. 17 |
| 4,685,941 | 8/1987 | Sato | 96/114 |
| 5,145,495 | 9/1992 | Elamin | 96/115 |
| 5,458,676 | 10/1995 | Herbst et al. | 96/116 |
| 5,592,754 | 1/1997 | Krieder et al. | 96/114 |

FOREIGN PATENT DOCUMENTS

| | | | |
|---|---|---|---|
| 0 350 215 A2 | 1/1990 | European Pat. Off. . | |
| 3106469 | 9/1982 | Germany | 96/111 |
| 34 45 699 A1 | 6/1986 | Germany . | |
| 3504884 | 7/1986 | Germany | 96/111 |
| 4141696 | 7/1993 | Germany | 96/114 |
| 54-145060 | 11/1979 | Japan | 96/116 |
| 6-154536 | 6/1994 | Japan | 96/111 |
| 457 934 | 2/1989 | Sweden . | |
| 465 631 | 10/1991 | Sweden . | |
| 578997 | 11/1977 | U.S.S.R. | 96/116 |
| 1745310 | 7/1992 | U.S.S.R. | 96/114 |
| 91/16224 | 10/1991 | WIPO | 95/10 |

*Primary Examiner*—Duane S. Smith
*Attorney, Agent, or Firm*—Lerner, David, Littenberg, Krumholz & Mentlik, LLP

[57] ABSTRACT

Device and method for the regeneration of a drying agent in compressed air system. The wetting degree of the drying agent is estimated and recorded by a control unit. The control unit ensures that the drying agent is dehumidified as soon as the wetting degree has reached a certain wetting degree. This certain wetting degree may be set to different levels for different operational condition.

17 Claims, 4 Drawing Sheets

AIR DRYING DEVICE FOR A PNEUMATIC SYSTEM

TECHNICAL FIELD

The present invention relates to a dehumidifying device for a single-tower dryer in a compressed air system. The device comprises a control unit, a compressor, a container which is connected to the compressor via a first connection and filled with drying agent, a first and a second pressure tank which are connected to the container via a second and a third connection, of which the first pressure tank serves as an air tank for prospectively connected consumers of compressed air, and the second pressure tank serves as an air tank for dried air intended to be used for dehumidification of the drying agent, a first valve which is connected to the container and which may adopt a first position when a connection between the interior of the container and the ambient atmosphere is open, and a second position when the connection between the interior of the container and the ambient atmosphere is closed, and also a second valve, controlled by the control unit.

The present invention also relates to a dehumidifying device, without any separate tank for dried air, in a compressed air system which comprises a control unit, a compressor, a container which is connected to the compressor via a first connection and filled with drying agent, a pressure tank which is connected to the container via a second connection, in which the pressure tank serves as an air tank for prospectively connected consumers of compressed air and as a tank for dried air intended to be used for dehumidifying the drying agent, a first valve which is connected to the container and which may adopt a first position when a connection between the interior of the container and the ambient atmosphere is open, and a second position when the connection between the interior of the container and the ambient atmosphere is closed, a second valve which is controlled by the control unit, and also a third valve which is controlled by the control unit.

Furthermore, the invention relates to a method for the regeneration of a drying agent which is a part of a single-tower drier in a dehumidifying device, wherein the dehumidifying device comprises a control unit, a compressor, a container which is connected to the compressor via a first connection and filled with drying agent, a pressure tank which is connected to the container via a second connection, wherein the pressure tank serves as an air tank for prospectively connected consumers of compressed air, and as a tank for dried air intended to be used for dehumidifying the drying agent, a first valve which is connected to the container and which may adopt a first position when a connection between the interior of the container and the ambient atmosphere is open and a second position when the connection between the interior of the container and the ambient atmosphere is closed, a second valve which is controlled by the control unit, and also a third valve which is controlled by the control unit.

Furthermore, the invention relates to an equivalent method, for a dehumidifying device without any separate tank, for the regeneration of a drying agent being part of the dehumidifying device, wherein the device comprises a control unit, a compressor, a container which is connected to the compressor via a first connection and filled with drying agent, a first and a second pressure tank which are connected to the container via a second and a third connection, of which the first pressure tank serves as an air tank for prospectively connected consumers of compressed air, and the second pressure tank serves as a tank for dried air, intended to be used for dehumidifying the drying agent, a first valve which is connected to the container and which may adopt a first position when a connection between the interior of the container and the ambient atmosphere is open, and a second position when the connection between the interior of the container and the ambient atmosphere is closed, and also a second valve which is controlled by the control unit.

TECHNICAL PROBLEM

In order to get a compressed air system to function without hitches, water has to be removed from the air which is compressed. If the air is not dried, water may condense during the expansion which will follow at a later stage in the compressed air system. Such water implies the risk of freezing and corrosion, and thus a risk of malfunction of the valves in the system, and also a risk that the system is damaged.

STATE OF THE ART

One way to handle this problem is to add alcohol vapours to the intake air or to inject alcohol into the compressed air. These methods, however, exhibit some disadvantages. An example of such a disadvantage is that equipment for the handling of alcohol injections must be added to the compressed air system. A second disadvantage is that such a system consumes and emits alcohol to the ambient air.

Another, more advantageous way, is to utilize a dehumidifying unit in the compressed air system. The dehumidifier consists of a container which is filled with a ceramic material. The ceramic material is designed as a multitude of granules, and therefore the total surface of the material is very large. The water molecules adhere to the surface of the ceramic.

However, the ceramic material may only hold a certain quantity of water; thereafter the holding capacity is saturated and the air is not dried any more. The drying ability of the ceramic material may, however, be regenerated by means of drying the material. The material is dried by dry air which passes by and dehumidifies the surface. The drying ability of the air used for drying the ceramic, is dependent on the air volume, but does not exhibit the same dependence on the pressure. In order to dry a ceramic which has dehumidified a volume of air, the same volume of dried air is, in principle, required. By using drying air at an essentially lower pressure, a large share of the air may be utilized for useful work. A common ratio is that 10 liters of air at 12 bars of pressure is dried by the compound and that the compound is dried with 10 liters of air at 1 bar of pressure.

The normal course for dehumidification is that a pressure tank is successively filled with air until the pressure reaches a certain level, usually approx. 12 bar. At the same time a second pressure tank, the drying tank, is filled with air. When the pressure has reached the predetermined level, a valve opens in the container which contains the drying ceramic so that this container is connected with the environment. In this way the drying tank will be evacuated of air which flows back through the dehumidifying unit, whereby the ceramic is dried.

This system exhibits an disadvantage in those cases when a lot of compressed air is consumed incidentally, for instance when containers are to be moved and lifted by a truck. In these cases, an operating time of approx. 30–45 minutes of the compressor in the compressed air system is not uncommon. During this time period a lot of air is consumed, which implies that the pressure in the air tank will not be able to reach the limit where the valve in the container for drying ceramic is supposed to open. Thus, the drying system will not be activated, despite the fact that a very large air volume has passed through the drying agent. This implies that non-dried air may enter the system.

One way of solving this problem is to utilize a two-tower drier. A two-tower drier is composed of two containers, towers, which contain a ceramic drying agent. Such a drier divides off a certain quantity of the air which has been dried in one of the towers, for drying the other tower. The two-tower drier also comprises a device for alternating the flow through the towers with a certain frequency. In this way, a continuous operation of the compressor may be allowed, without any risk that non-dried air shall enter the system. An example of such a system is disclosed in the patent publication SE 457 934.

Such a system, however, exhibits the disadvantage that the system has to contain two containers for drying agent, which is expensive and space-consuming. Furthermore, one portion of air is divided off for the drying of a second tower, even when this is not required in order to keep the system dry. This implies that more power must be fed into the system than when a single-tower dehumidifier is utilised.

TECHNICAL SOLUTION

A purpose of the present invention is to achieve a method and a device, in which compression courses of long duration should be allowable, without incurring any risk of non-dried air entering the compressed air system. A further purpose of the present invention is to achieve a method and a device in which the disadvantages of a two-tower drier may be avoided.

The above-mentioned purposes are achieved by adding a control unit to the system which records the air volume supplied to the pressure tank. The control unit also records the drying courses of the ceramic. Since the quantity of liquid, received by the ceramic, is proportional to the volume of non-dried air which has passed the ceramic, and the quantity of liquid emitted by the ceramic is proportional to the volume of dried air which has passed the ceramic, the control unit may record an estimate of the wetting degree of the ceramic, i.e. the remaining moisture retention capacity of the ceramic at a particular point in time. When the wetting degree reaches a certain predetermined level, a compulsory drying of the ceramic will occur by means of the valve in the ceramic container being opened, and the air in the drying volume being allowed to pass and dry the ceramic material. Consequently, this takes place independent of whether maximal pressure has been attained in the pressure tank or not; the determining factor is the wetting degree of the drying agent. In a preferred embodiment, two different wetting degrees may be allowed before compulsory drying occurs. Such an embodiment is of particular use when the drying system is utilized for a compressed air system being part of a vehicle. In this case, a higher wetting degree should be allowed when the vehicle stands still, while a lower level is allowed when the vehicle moves. This choice is based on the fact that the consumption is particularly high when containers are lifted and that the vehicle stands still during such lifts.

A preferred embodiment of the invention will be described below with reference to the attached drawings. The preferred embodiment relates to a dehumidifying device which is intended to be used in connection with a motor vehicle.

PREFERRED EMBODIMENTS

Figure 1:
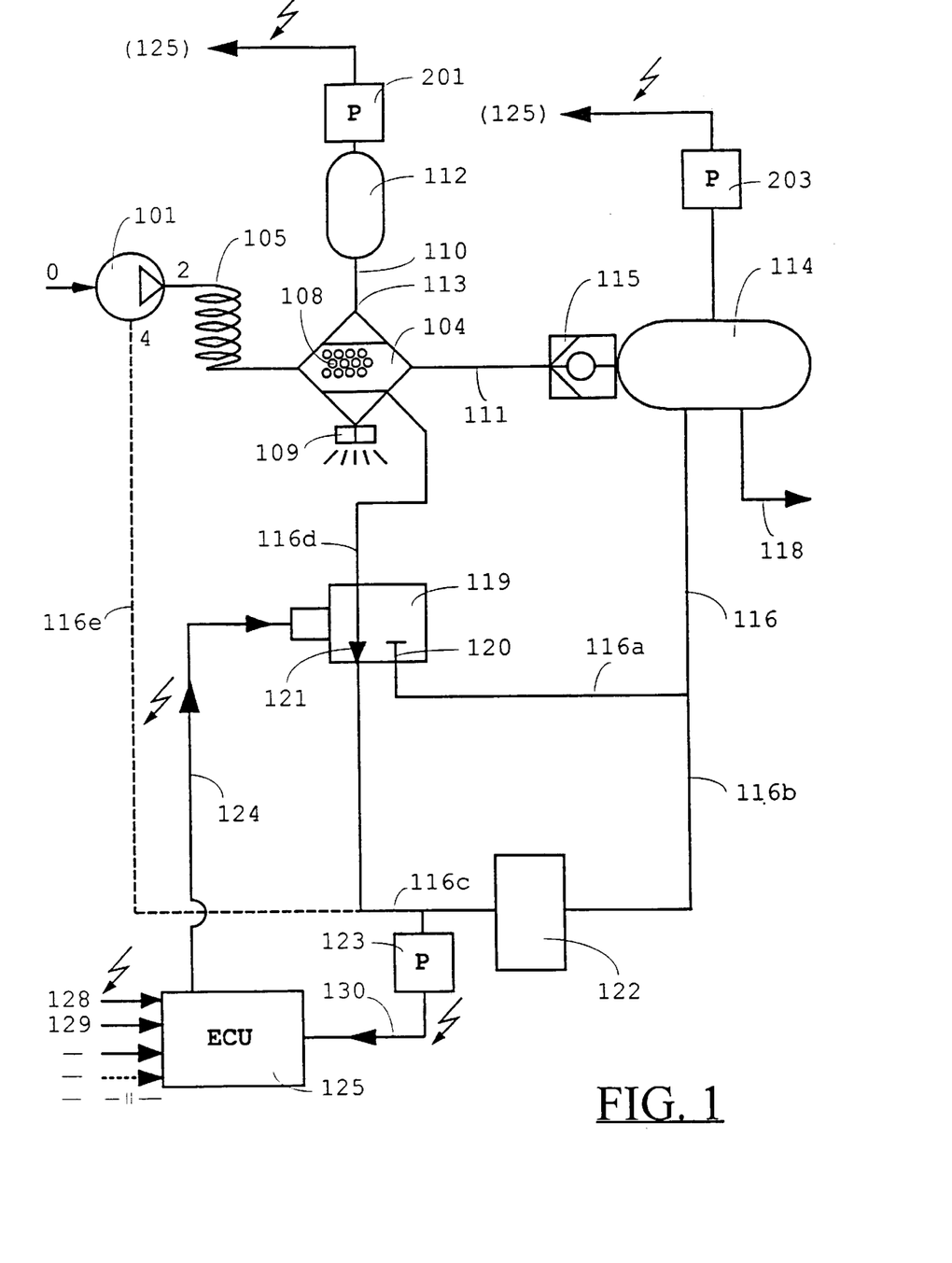
FIG. 1 shows an elementary drawing of a dehumidifying device with a separate tank for compressed air.

A compressor 101 is connected to a compressed air system. The compressor has an inlet 0 where air is sucked into the system, and an outlet 2 where compressed air flows towards the dehumidifier 104. A cooling coil 105 is connected between the compressor and the dehumidifier. The purpose of the cooling coil is to cool the air, which implies that a portion of the water vapour, being part of the air, will be condensed. The condensed water is collected on the bottom of the dehumidifier. A drying agent, consisting of a multitude of porous zeolite balls 108, is included in the dehumidifier. A valve 109 is connected in the lower portion of the dehumidifier.

Two conduits 110 and 111 are connected to the dehumidifier. The conduit 110 leads to a drying air container 112. The conduit 110 is provided with a throttle 113. The throttle may be designed as a small hole between the drying air container and the dehumidifier. The task of the throttle is to ensure that the drying air container is evacuated under controlled conditions, i.e. that it is evacuated with a controlled flow during approx. 20 seconds. The drying result will deteriorate if the drying air container is evacuated too fast. Also the zeolite balls contribute to the back pressure which causes the air in the drying container to be let out with a suitable flow, when the valve 109 is open. The conduit 111 leads to a pressure tank 114, via a check valve 115. The task of the check valve is to ensure that the pressure tank is not emptied when the valve 109 opens. The check valve opens in the forward direction when the pressure in the dehumidifier is higher than the pressure in the pressure tank. This implies that the drying air container 112 may be evacuated without affecting the pressure in the pressure tank 114. Furthermore, it will be possible to build up the pressure in the drying air tank rapidly after an evacuation, since the pressure in the drying air tank will be restored before the pressure in the pressure tank is allowed to rise. This implies that consecutive evacuations of the drying air tank may take place in relatively close succession.

Two conduits 116 and 118 lead from the pressure tank. The conduit 118 is connected to compressed air-consuming units, such as for instance brakes, suspension and lifting devices. The conduit 116 is connected to a solenoid valve 119. The solenoid valve 119 may adopt two positions, 120 and 121. When the valve is in the position 121, a spontaneous evacuation of the drying air tank is performed, if the maximum pressure, usually approx. 12 bar, has been reached in the pressure tank. When the valve is in the position 120, a compulsory evacuation of the drying air tank is performed on condition that a sufficient pressure in order to open the valve 109, has been reached in the pressure tank.

When the solenoid valve 119 is in the position 121, the valve 109 is connected to the pressure tank 114 via the conduits 116, 116*b*, 116*c* and 116*d*, and also via the pressure regulator 122 and the solenoid valve 119. The regulator is closed until maximum pressure has been reached in the pressure tank 114. When this pressure has been reached, the regulator opens whereby the conduits 116*c* and 116*d* are pressurized and the valve 109 opens. A pressure switch 123 is mounted into the conduit 116*c*. The pressure switch 123 records that there is a pressure in the conduit 116c. A signal is transmitted from the pressure switch, via a wire 130, to a control unit 125. Whenever applicable, the conduit 116e connects the regulator to an inlet to a discharge valve on the compressor. The compressor is shut off when the conduit 116e is pressurized. Consequently, the compressor is shut off when the spontaneous drying occurs. In this way, the control unit may record if and how long the compressor has been pumping air into the system. The solenoid valve 119 is normally set in the position 121.

The drying air tank may be compulsorily emptied by setting the valve in position 120. When the valve adopts this position, the valve 109 is directly connected to the pressure tank 114 via the conduit 116a.

The solenoid valve 119 is controlled from the control unit 125, via the wire 124. Input is fed to the control member 125 via wires 128, 129 and 130. The input may, for instance, be composed of the engine speed of the vehicle to which the system is connected, and thereby the volume of air which the compressor has compressed during a fixed period of time, the speed of the vehicle, and also whether the compressor is working or is unloaded. Of particular importance is whether the vehicle is in motion or not.

The compressor 101 is mechanically connected to the engine. This implies that for each revolution the crankshaft of the engine rotates, the compressor rotates a certain number of revolutions. For each revolution the compressor rotates, a certain volume of air is compressed. Thus, the quantity of air which is compressed during a time period is proportional to the number of revolutions the engine rotates during the same time period. The control member 125 records the quantity of air which is compressed and dried by the drying agent 108. The drying agent 108 retains water on its surface. The quantity of water which the drying agent retains is dependent on the quantity of air which passes the agent. Thus, the wetting degree of the drying agent may be estimated by recording the quantity of air which passes by.

The measure of the wetting degree is thereafter utilized for controlling the solenoid valve 119. When the wetting degree has reached a certain magnitude, a control signal is emitted from the control unit 125 via the wire 124 to the solenoid valve 119. Thereby, the solenoid valve changes its position from 121 to 120, whereby the valve 109 opens and the air in the drying air container is evacuated.

In one embodiment, a pressure sensor 201 is connected to the drying air container 112. By means of measuring the actual pressure, when a compulsory drying of the drying agent takes place, the volume of the drying air, which passes the drying agent during a compulsory drying, may be calculated. An even more accurate result is obtained if the control unit is provided with the actual air pressure as an input. The control unit may be furnished with this data from a pressure sensor 203. A sufficiently good estimation of the volume of drying air which passes the drying agent during compulsory drying, may, however, be obtained by storing an empirical value for the volume of drying air which passes the drying agent during compulsory drying in the control unit. In this case, there is no need to provide the drying air container 112 with a pressure sensor.

Figure 2:
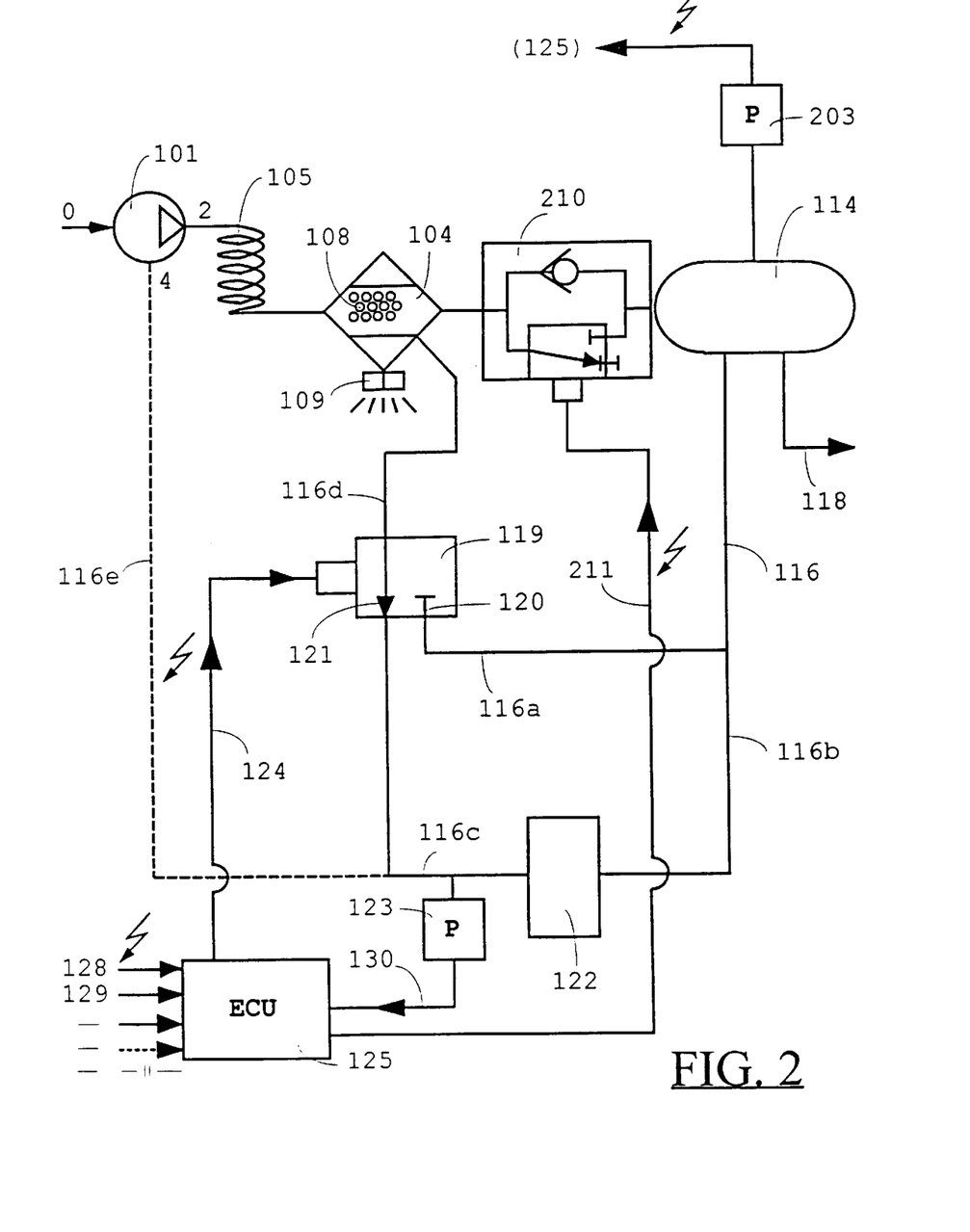
FIG. 2 shows an elementary drawing of a dehumidifying device without any separate tank for compressed air.

In FIG. 2, an alternative embodiment of the invention is shown. The drying air container 112 is now removed and replaced by the regular pressure tank 114. In this case, the check valve 115 is replaced by a steerable valve 210. The valve 210 is regulated from the control unit 125. When compulsory drying is about to take place, the control unit transmits a control signal via the wire 211, whereby the valve 210 is compulsorily opened. Consequently, air may flow from the pressure tank 114 to the dehumidifier. The air passes and dehumidifies the drying agent in order to thereafter flow out through the valve 109. The reduction of the wetting degree may be estimated by regulating the time which the valve 210 is open. In the same way as proposed above, the estimation of the reduction of the wetting degree may be done more accurately if a pressure sensor 203 is connected to the pressure tank 114. A sufficiently good estimate of the volume of drying air, which passes the drying agent during compulsory drying, however, may be obtained by storing an empirical value in the control unit for the volume of drying air which passes the drying agent per time unit during compulsory drying. In this case, there is no need to provide the pressure tank 114 with a pressure sensor. Other details in FIG. 2 correspond to FIG. 1, and have therefore not been furnished with any reference numerals.

Figure 3:
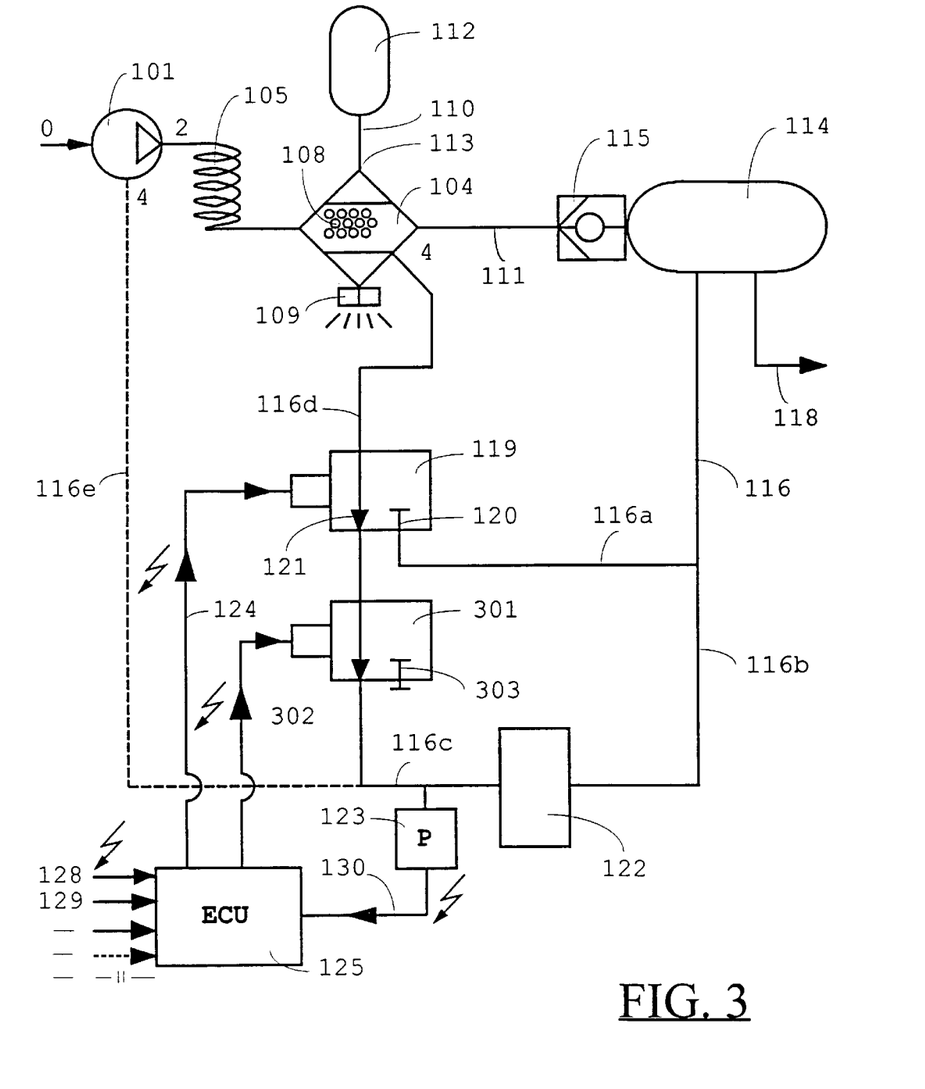
FIG. 3 shows an elementary drawing of a dehumidifying device comprising two adjustable solenoid valves.

In FIG. 3, a particular embodiment of the invention is shown, in which a second adjustable solenoid valve 301 is inserted into the conduit 116c. The solenoid valve 301 may adopt two positions 302 and 303. Which position the valve adopts is controlled by the control unit 125. When the valve is in the position 302, air may pass through the conduit 116c to the solenoid valve 119. When the solenoid valve adopts the position 303, there is no contact between the conduit 116e and the solenoid valve 119. This implies that when the regulator 122 opens, the valve 109 will not open even if the solenoid valve 119 is in the position 121. Thus, no drying of the drying agent will take place when the pressure in the pressure tank has reached the level at which the regulator opens and the compressor is shut off. When the wetting degree estimated by the control unit is low and possible evacuations of the drying air container 112 or evacuation of air from the pressure tank are unnecessary, the solenoid valve is set in the position 303.

Figure 4:
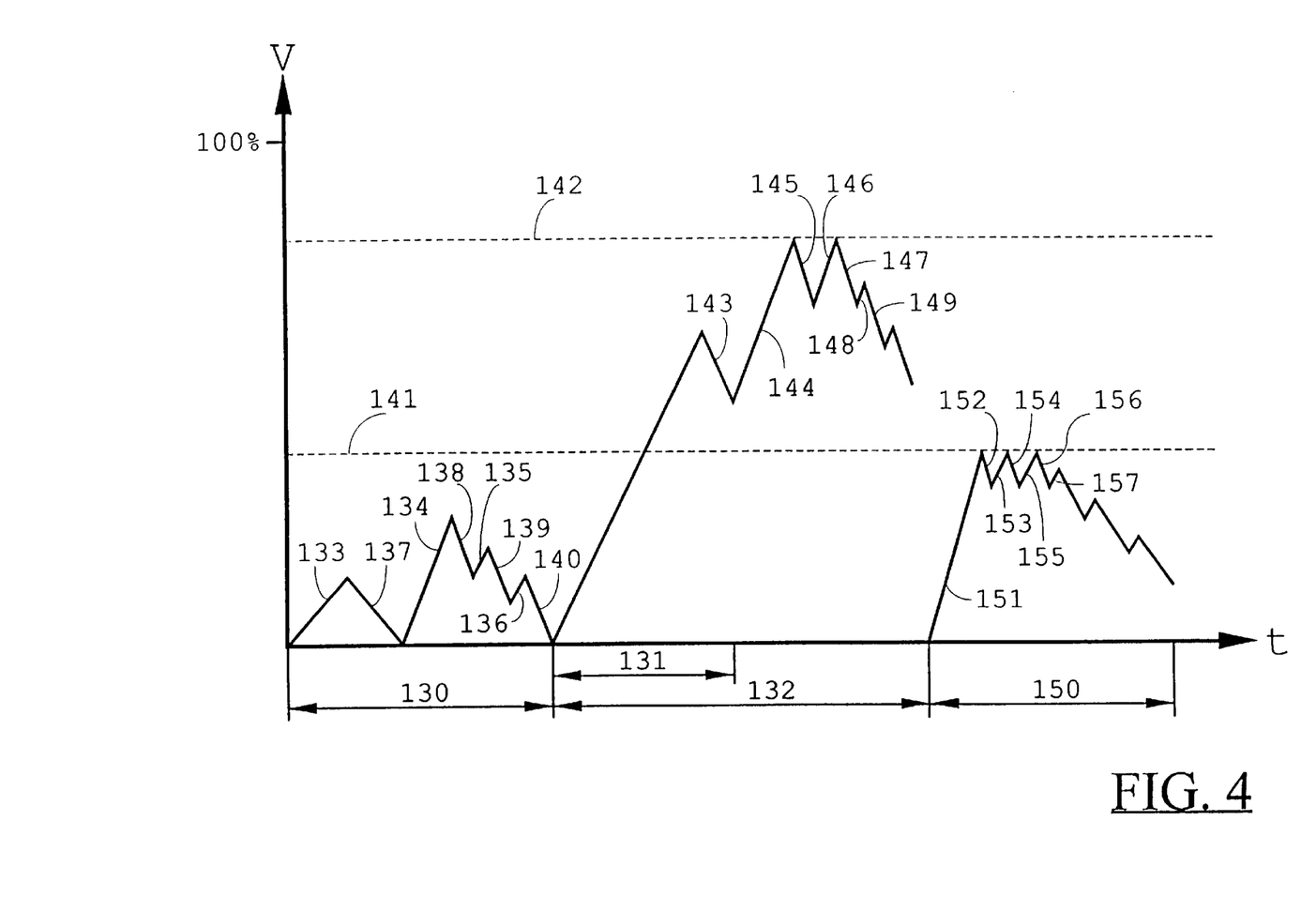
FIG. 4 shows an example of how a preferred embodiment of the invention functions.

By means of a diagram, FIG. 4 shows an example of how a preferred embodiment of the invention functions. In the diagram, the wetting degree (V) is expressed as a function of time (t). In the main, three different time intervals 130, 132 and 150 are shown. During the time interval 130, the wetting degree is kept below a level 141, 142 at which compulsory drying takes place. During the time interval 132, the compressed air system is subjected to heavy loading, for instance during marshalling, and a higher wetting degree is allowed before compulsory drying takes place. During the time interval 150, the compressed air system is subjected to normal loading and the wetting degree is kept at a level at which compulsory drying may take place. The vehicle is in motion, and therefore a lower wetting degree should be allowed.

The wetting degree of the drying agent is low when the system is put into operation. A wetting degree of 0% implies that the drying agent is completely dry. A wetting degree of 100% implies that the drying agent cannot hold any more moisture, i.e. the drying agent is saturated.

The time interval 130 shows a number of successive working phases 133–136 for the compressor, which are followed by a number of drying phases 137–140. During the time interval 130, the wetting degree does not reach the limit at which the solenoid valve adopts the position 120 and the valve 109 is compulsorily opened. During the time interval 130, the solenoid valve 119 is set in the position 121.

The working phase 133 is short, and consequently the air in the drying air container 112 is sufficient in order to completely dry the drying agent 108. In this case, the drying takes place because of the pressure in the pressure tank 114 reaching the limit at which the valve 109 is opened by being affected by the pressure in the pressure tank 114, which is conveyed through the conduits 16, 16b, 16c and 16d.

The working phase 134 is longer, for example due to the fact that the consumption from the pressure tank 114 via the conduit 118 is large, and that the pressure inside the pressure tank 114 therefore does not find time to build up sufficiently fast. In this case, the drying agent will not be completely dried but a certain residual moisture will remain after the drying. When the drying phase 138 is over, the pressure in the pressure container 114 will be built up during the working phase 135, whereafter a new drying period 139 dries the drying agent 108 by, once again, opening the valve 109. During regular road driving, the wetting degree will successively be reduced since the outtake of compressed air is not particularly large. This is illustrated by the working and drying phases 135–140.

The time interval 131 constitutes a very long compression time. An example of this may occur when a truck needs to marshal and lift containers. In this case, it is important that the compressor is able to work as continuously as possible, i.e. a rather high wetting degree should be allowed. In order to make this possible, the level 142 may be set to a rather high percentage. This implies that the compressor is allowed to work for a long time before the drying agent compulsorily is subjected to drying. This, however, also implies that it cannot be guaranteed that the wetting degree at the beginning of the long working phase substantially falls short of this level. One way of solving this problem is to introduce another level 141. The choice as to which of the levels 141 or 142 should control a possible compulsory opening of the valve 109 is made by the control unit 125. This choice is made on the basis of the input to the control unit. Such input may be the speed of the vehicle or a manual selector. For instance, the selector may be interlocked to the selector which is used for alternating between manual and automatic level control of the air suspension. This selector is set for manual regulation only when the vehicle stands still and is used for marshalling. By utilizing an incoming signal from this selector, the system may in a simple way be controlled in order to allow a high wetting degree, before compulsory drying takes place when the vehicle stands still and is marshalling, and to allow a lower wetting degree in other cases. The higher level of the allowable wetting degree before compulsory drying occurs, which is utilized for instance when marshalling, may be constituted of a wetting degree of 50–99%, preferably 75–90%. The lower level of allowable wetting degree before compulsory drying takes place, which is utilized for instance for long distance operation, is constituted of a wetting degree of 15–50%, preferably 25–35%.

A preferred embodiment is that, when the vehicle stands still, a high wetting degree, i.e. the level 142, should be allowed, while a lower level is allowed when the vehicle is moving. This choice is based on the fact that the consumption is particularly high when lifting containers, and that the vehicle stands still during these lifts.

In this case, the level 142 is not reached during the time interval 131, which implies that the drying during the drying period 143 takes place since the pressure in the pressure tank 114 is sufficiently high in order to open the valve 109. During an additional compression period 144, the level 142 is reached, whereby a compulsory drying course 145 takes place. This is followed by a further compression period 146, followed by a compulsory drying 147. Not until during the compression course 148, does the pressure in the pressure tank 114 reach the level at which the valve 109 opens due to the pressure in the pressure tank 114 reaching its maximum pressure. After compression course 148, further drying and compression periods follow, including compulsory drying 149.

The time interval 150 constitutes a phase when active compulsory drying of the drying agent takes place. In this case, the limit for the wetting degree is constituted by level 141. During the working phase 151, the wetting degree reaches a limit 141, at which compulsory drying should take place. Drying occurs during the phase 152, whereafter a new working phase 153 begins. During this phase, the limit 141 is once more reached, whereby compulsary opening of the valve 109 takes place once more. Compulsary drying 152 and working phase 153 are followed by subsequent compulsary drying periods 154,156 and subsequent compression periods 155,157.

What is claimed is:

1. A compressed air system comprising:
    a compressor;
    a pressure tank;
    a dehumidifier filled with a drying agent;
    a first conduit connecting said compressor and said dehumidifier;
    a second conduit connecting said pressure tank and said dehumidifier;
    a first valve connected to said dehumidifier, said first valve having a first position in which said dehumidifier is open to the atmosphere and a second position in which said dehumidifier is closed to the atmosphere;
    a control unit for recording the quantity of air compressed by said compressor, and for recording data when said first valve is in said open position, whereby said control unit can estimate the degree of wetting of said drying agent using said recorded data; and
    a second valve connected to said dehumidifier and controlled by said control unit, said second valve having a first position at which said first valve is set in said open position when the pressure tank reaches a predetermined level and a second position at which said first valve is set in said open position where said degree of wetting of said drying agent has reached a predetermined level independent of the pressure in said pressure tank.

2. The compressed air system of claim 1 wherein said pressure tank comprises a first pressure tank, and including a second pressure tank and a third conduit connecting said second pressure tank to said dehumidifier for dehumidifying said drying agent.

3. A compressed air system according to claim 2, further comprising:
    a cooling coil associated with said first conduit for condensing at least part of the water content of said compressed air; a check valve associated with said second conduit to prevent evacuation of said first pressure tank when the first valve is in the open position, and a throttle valve associated with said third conduit, wherein said second pressure tank can be evacuated during a controlled time period.

4. A compressed air system according to claim 3, wherein:
    said compressed air system is for a motor vehicle, whereby said control unit can be inputted with the speed of said motor vehicle, such that when said second valve is in said second position said predetermined level of said degree of wetting of said drying agent is lower when said vehicle is in motion than when said vehicle stands still.

5. A compressed air system according to claim 2, further comprising:
    a pressure sensor associated with said second pressure tank and connected to said control unit, wherein said control unit can calculate the quantity of drying air used for regenerating said drying agent, based on the pressure measured by said pressure sensor.

6. A compressed air system according to claim 2, further comprising:
    a third valve connected to said second valve and controlled by said control unit, said third valve having a first position wherein said compressed air is supplied to said second valve and a second position wherein said first valve is set in said closed position when said pressure in said first pressure tank reaches a predetermined level.

7. A compressed air system, comprising:
    a compressor;
    a dehumidifier filled with a drying agent;
    a first conduit connecting said compressor to said dehumidifier;
    a second conduit connecting said pressure tank to said dehumidifier;
    a first valve connected to said dehumidifier, said first valve having a first position in which said dehumidifier is open to the atmosphere and a second position in which said dehumidifier is closed to the atmosphere;
    a control unit for recording the quantity of air which is compressed by said compressor, and for recording data when said first valve is in the open position, where by said control unit can estimate the degree of wetting of said drying agent using said recorded data;
    a second valve connected to said dehumidifier and controlled by said control unit, said second valve having a first position in which said first valve is set in the open position when said pressure tank reaches a predetermined level and a second position in which said first valve is set in the open position when said degree of wetting of said drying agent has reached a predetermined level independent of said pressure in said pressure tank; and
    a third valve connected between said dehumidifier and said pressure tank and controlled by said control unit, wherein said third valve is set in an open position to allow air to flow from said pressure tank to said dehumidifier to dry said drying agent.

8. A compressed air device according to claim 6, wherein:
    said compressed air system is for a motor vehicle, whereby said control unit can be inputted with the speed of said motor vehicle, such that when said second valve is in said second position said predetermined level of said degree of wetting of said drying agent is lower when said vehicle is in motion than when said vehicle stands still.

9. A compressed air device according to claim 7, further comprising:
    a fourth valve connected to said second valve and controlled by said controller, said fourth valve having a first position wherein said compressed air is supplied to said second valve and a second position wherein said first valve is set in said closed position when said pressure in said first pressure tank reaches a predetermined level.

10. A method for the regeneration of a drying agent in a compressed air system, the method comprising a compressor, a pressure tank, a dehumidifier filled with a drying agent, a first conduit connected between said compressor and said dehumidifier, a second conduit connected between said pressure tank and the dehumidifier, a first valve connected to said dehumidifier, said first valve having an open position in which said dehumidifier is open to the atmosphere and a closed position in which said dehumidifier is closed to the atmosphere, a second valve connected to said dehumidifier, a third valve connected between the dehumidifier and the pressure tank, and a control unit for recording the quantity of air which is compressed by said compressor, said method comprising
    recording data in said control unit when said first valve is in the open position, and estimating the degree of wetting of said drying agent using said recorded data;
    sensing the wetting degree of said drying agent using said control unit, controlling said second valve using said control unit;
    setting said second valve to a first position, when said first valve is set in an open position when said pressure tank reaches a predetermined level;
    setting said second valve to a second position when said first valve is set in the open position, when said degree of wetting of said drying agent has reached a predetermined level independent of said pressure in said pressure tank; and
    opening said third valve to allow air to flow from said pressure tank to said dehumidifier to dry said drying agent.

11. A method for the regeneration of a drying agent in a compressed air device comprising a compressor, a pressure tank, a dehumidifier filled with a drying agent, a first conduit connected between said compressor and said dehumidifier, a second conduit connected between said pressure tank and said dehumidifier, a first valve connected to said dehumidifier, said first valve having a open position in which said dehumidifier is open to the atmosphere and a closed position in which said dehumidifier is closed to the atmosphere, a second valve connected to said dehumidifier, and a control unit for recording the quantity of air which is compressed by said compressor, said method comprising:
    recording data when said first valve is in the open position, and estimating the degree of wetting of said drying agent using said recorded data;
    sensing the wetting degree of said drying agent using said control unit controlling said second valve using said control unit;
    setting said second valve to a first position, when said first valve is set in a open position when said pressure tank reaches a predetermined level; and
    setting said second valve to a second position when said first valve is set in the open position, when said degree of wetting of said drying agent has reached a predetermined level independent of said pressure in said pressure tank.

12. The method of claim 11, the method further comprising:
    providing said pressure tank as a first pressure tank, and regenerating said drying agent by including a second pressure tank at a third conduit connecting said second pressure tank to said dehumidifier.

13. A method according to claim 12, further comprising:
    monitoring the compressed air produced by said first pressure tank and passed over said drying agent to determine the wetting degree of said drying agent to prevent said drying agent from being saturated.

14. A method according to claim 12, further comprising:

monitoring the quantity of drying air produced by said second pressure tank and passed over said drying agent to determine the wetting degree of said drying agent to prevent said drying agent from being saturated.

15. A method according to claim 12, further comprising:

providing said control unit with a memory; and storing in said memory a wetting degree value of said drying agent;

updating said wetting degree value by determining the quantity of air which is compressed by said first pressure tank and passes over said drying agent, said wetting degree value of said drying agent being increased by a incremental value when a quantity of compressed air passes over said drying agent; and updating said wetting degree value by determining when said first valve is in an open position, said wetting degree value of said drying agent being decreased by a reductional value each time said first valve is in an open position.

16. A method according to claim 12, the method further comprising:

sensing at least one of the temperature and the humidity of the ambient air, wherein said incremental value is a function of at least one of the sensed temperature and humidity of the ambient air.

17. A method according to claim 12, the method further comprising:

sensing the pressure in the second pressure tank, wherein said reductional value is a function of the pressure sensed.

* * * * *

UNITED STATES PATENT AND TRADEMARK OFFICE
CERTIFICATE OF CORRECTION

PATENT NO.   : 6,077,330
DATED        : June 20, 2000
INVENTOR(S)  : Sabelström

It is certified that error appears in the above-identified patent and that said Letters Patent is hereby corrected as shown below:

Title Page, Item [57] Abstract, line 1, after "in" insert --a--.

Title Page, Item [57] Abstract, line 2, after "system" insert --, wherein the--.

Col. 9, line 31, "where by" should read --whereby--.

Col. 10, line 36, "a" should read --an--.

Col. 10, line 50, "a" should read --an--.

Col. 10, line 57, "11" should read --10--.

Col. 11, line 15, "a" should read --an--.

Signed and Sealed this

Tenth Day of April, 2001

Attest:

NICHOLAS P. GODICI

Attesting Officer

Acting Director of the United States Patent and Trademark Office